H. I. LEA.
GAS PURIFIER.
APPLICATION FILED FEB. 14, 1907.
968,370.
Patented Aug. 23, 1910.
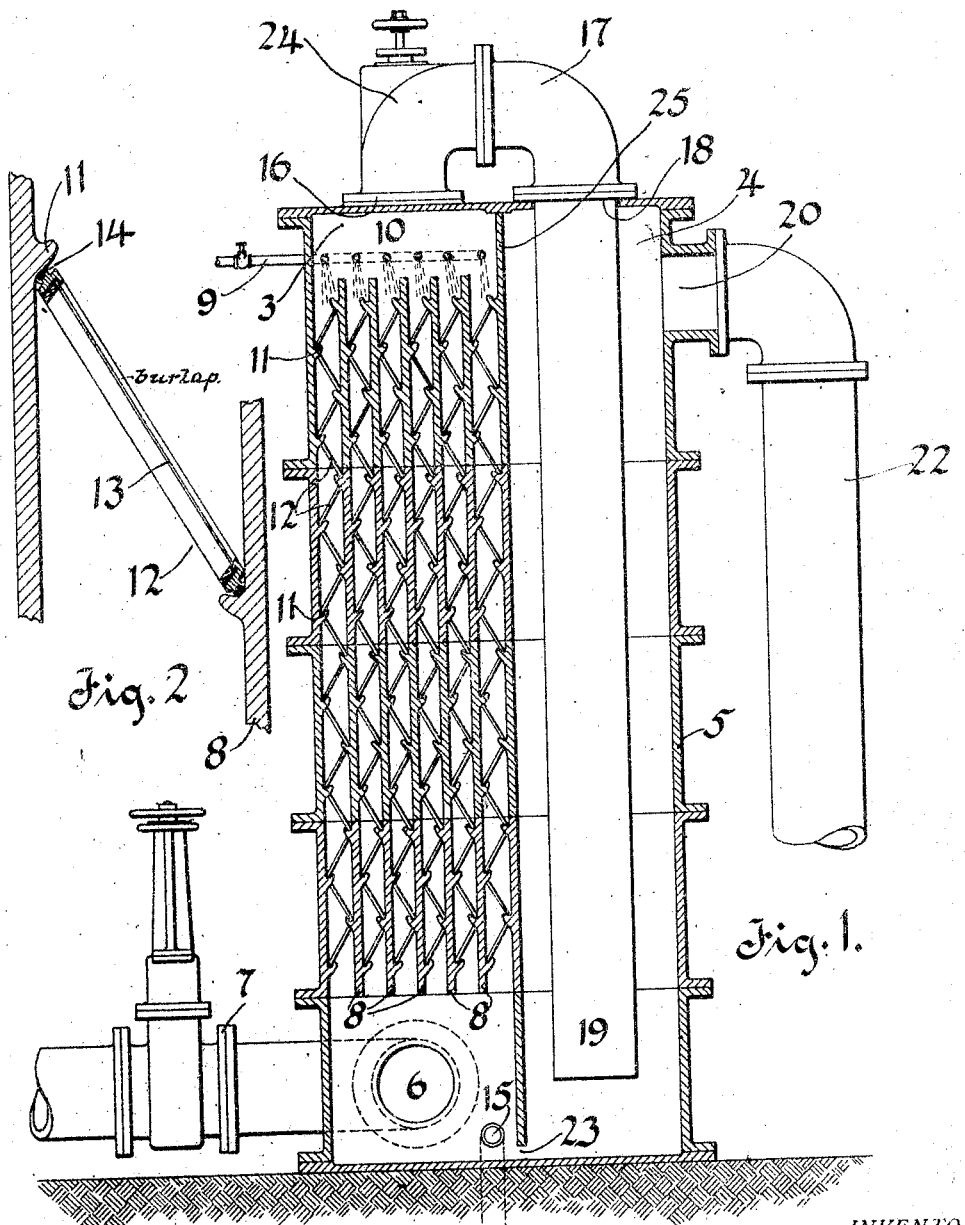

UNITED STATES PATENT OFFICE.

HENRY I. LEA, OF PITTSBURG, PENNSYLVANIA, ASSIGNOR TO THE WESTINGHOUSE MACHINE COMPANY, A CORPORATION OF PENNSYLVANIA.

GAS-PURIFIER.

968,370.  Specification of Letters Patent.  Patented Aug. 23, 1910.

Application filed February 14, 1907.  Serial No. 357,344.

*To all whom it may concern:*

Be it known that I, HENRY I. LEA, a citizen of the United States, and a resident of Pittsburg, in the county of Allegheny and State of Pennsylvania, have made a new and useful Invention in Gas-Purifiers, of which the following is a specification.

This invention relates to gas purifiers and has for an object the production of a simple and efficient apparatus particularly adapted to remove the lamp black and smaller particles of dust from gas to be purified.

The apparatus covered by my invention comprises a scrubber chamber through which the gas to be purified is caused to pass, a drier chamber which receives the purified gas delivered from the scrubber chamber, and from which the gas is delivered to the distributing mains or to other purifying apparatus.

The gas in passing through the scrubber chamber is caused to flow through a series of screens over and through which water is caused to flow in a direction opposite to the flow of gas. Under such conditions the gas carrying the most recrement comes in contact with water which has been utilized in partially scrubbing the gas and the cleanest gas comes in contact with the cleanest water.

In the drawings accompanying this application and forming a part thereof; Figure 1 is a sectional elevation of an organized apparatus embodying my invention; and, Fig. 2 is a sectional elevation of a detail of my invention.

A scrubber chamber 3 and a drying chamber 4 are inclosed within a shell 5, which is formed of a number of annular sections superimposed and secured together by flanged connections, or in any other suitable manner. The shell 5 is provided near the bottom with an inlet port 6, which communicates through suitable piping 7 with a source of gas supply and delivers the gas to the lower portion of the scrubbing chamber 3. A number of partitions 8, which are parallel to each other and to the vertical walls of the chamber 3, are located within the chamber above the inlet port 6. A water supply pipe 9 extends through the shell 5 into the upper portion of the chamber 3 above the partition 8 and delivers water from a number of communicating jets 10 to the chamber 3. The vertical walls of the chamber and partitions 8 are provided with brackets 11 which coöperate in supporting the screen holding frames 12. Each frame 12 is rectangular in shape and is provided with means for securing one or more thicknesses of screening 13 in place across it. The screening utilized with producer gas is preferably burlap, but other materials may be utilized. A strip of compressible packing material 14 is secured around the outside of each frame 12 and is adapted to pack the joint between the frame and its mounting members.

Each frame is supported on one of the brackets 11 and is adapted to rest against the adjacent wall or partition, assuming an inclined position and thereby presenting a series of perforations through which all the gases passing through the parallel walls must flow. The water jets 10, which are located in the upper portion of the chamber 3, are adapted to discharge a spray of water or other liquid onto the top screen of each series located between the parallel partitions and the frames are inclined at such an angle that the liquid will travel over the face of the screen rather than seep through it until it reaches the edge of the screen and will uniformly flow through onto the upper edge of the next screen, the top of which rests directly below the supporting bracket. With such an arrangement the water will zigzag through the narrow passages and will finally be discharged by the lowest screen of the series into a receptacle formed in the bottom part of the chamber 3 below the inlet port 6. The receptacle is provided with an overflow pipe 15 which communicates with a sump pit or any suitable drain.

A port 16 located at the top of the scrubber chamber 3 communicates through suitable piping 17 and a port 18, formed in the head portion of the apparatus, with the drying chamber 4. A pipe 19 communicates with the piping 17 and extends downwardly through the chamber 4. The gas, after leaving the purifying chamber, is conducted by the piping 17 and the pipe 19 to the bottom portion of the drying chamber 4, and after being discharged from the pipe 19, travels upwardly through the chamber 4 and is discharged from an outlet port 20, which is located in the top portion of the drying chamber. The port 20 communicates through suitable piping 22 with the gas delivering mains or with other purifying apparatus.

The function of the pipe 19 and the chamber 4 is to cause a quick reversal of direction in the flow of gas and a simultaneous lowering of the rate of flow in order that the water vapor carried forward from the chamber 3, which vapor may exist in objectionable quantities under certain temperatures, may be deposited in the bottom of chamber 4, from which it may flow to the lower end of the chamber 3 through an opening 23 to the overflow 15.

The construction shown involving an angle valve 24 in connection with elbow 17 is applicable only to a scrubber made up of two or more sections so arranged that either may be cut out of service for cleaning while the other sections are in operation. In a single scrubber, the elbow of piping 17 would be bolted to the partition 25 between chambers 3 and 4, said partition having an opening coinciding with the elbow and located above the water sprays in chamber 3, thus doing away with the angle valve 24.

The scrubber chamber 3 is preferably rectangular in shape and is preferably provided with a swinging door or other opening along one side, through which the screens may be introduced to the chamber and which, when it is closed, will coöperate with the packing material 14 around the frame portions 12 of each screen to form a tight joint. Under such conditions all the gas entering the apparatus through the port 6 is caused to pass through a number of screens which are washed with a continual flow of scrubbing liquid. It is my intention to employ in this scrubber screens of such characteristics as will allow the washing liquid to form films covering the several openings in the screen. The size of the individual opening will, therefore, be determined by the material from which the screen is made as well as by the nature of the liquid used in washing, the cohesive tension of the liquid being the determining factor. The gas, therefore, while finely subdivided in its flow through the screen, meets a further resistance in this film of liquid and such small particles as may be carried by the gas are, therefore, exposed to the liquid very effectively with a low consumption of liquid. In cleaning some gases, it is found that the particles moistened and retained by the liquid are washed back through the screens against the flow of gas. Under very favorable conditions, therefore, this scrubber would be self cleaning, but to provide for such cleaning of screens as may be made necessary by less favorable conditions, doors are provided in the scrubber shell, as before mentioned, through which the several screens may be easily removed for cleaning.

It will be apparent that the apparatus may be constructed in various ways. In the drawing the parallel partitions 8 are shown as constructed of metal, the brackets 11 being integrally formed on them. It may be found desirable in practice to utilize partitions, casing and frame of wood or other material. It may also be found desirable to modify the construction of the drying chamber, and all these changes may be made without departing from the spirit of my invention.

What I claim is:

A gas purifier comprising a casing, a plurality of partitions vertically arranged within said casing and having rests and screens supported by said rests and alternately inclined in opposite directions, the said screens having unobstructed spaces between them.

In testimony whereof, I have hereunto subscribed my name this 31st day of January, 1907.

HENRY I. LEA.

Witnesses:
 CHARLES W. McGHEE,
 E. W. McCALLISTER.